(12) United States Patent (10) Patent No.: US 11,951,550 B2
Kido et al. (45) Date of Patent: Apr. 9, 2024

(54) CEMENTED CARBIDE AND TOOL CONTAINING THE SAME

(71) Applicant: Sumitomo Electric Industries, Ltd., Osaka (JP)

(72) Inventors: Yasuki Kido, Osaka (JP); Katsumi Okamura, Osaka (JP); Takashi Sekiya, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/790,129

(22) PCT Filed: Jan. 20, 2022

(86) PCT No.: PCT/JP2022/002016
§ 371 (c)(1),
(2) Date: Jun. 30, 2022

(87) PCT Pub. No.: WO2023/139726
PCT Pub. Date: Jul. 27, 2023

(65) Prior Publication Data
US 2023/0226617 A1 Jul. 20, 2023

(51) Int. Cl.
*B32B 27/14* (2006.01)
*B23B 27/14* (2006.01)
*C22C 29/08* (2006.01)

(52) U.S. Cl.
CPC ............ *B23B 27/148* (2013.01); *C22C 29/08* (2013.01); *B23B 2224/00* (2013.01)

(58) Field of Classification Search
None
See application file for complete search history.

(56) References Cited

U.S. PATENT DOCUMENTS

2018/0274065 A1* 9/2018 Konyashin ............... B22F 3/16
2021/0189528 A1* 6/2021 Ohata ..................... B21B 27/03

FOREIGN PATENT DOCUMENTS

| CN | 112725676 A | 4/2021 |
| JP | 2008-132570 A | 6/2008 |
| JP | 2015-63708 A | 4/2015 |
| KR | 10-2017-0093402 A | 8/2017 |
| WO | 2019/151389 A1 | 8/2019 |

OTHER PUBLICATIONS

English translation of Yin et al. (CN 106756390) (Year: 2017).*
(Continued)

*Primary Examiner* — Ronak C Patel
(74) *Attorney, Agent, or Firm* — XSENSUS LLP

(57) ABSTRACT

A cemented carbide including tungsten carbide grains and a binder phase, in which a total content of the tungsten carbide grains and the binder phase in the cemented carbide is no less than 80 vol %, a content of the binder phase in the cemented carbide is no less than 0.1 vol % and no more than 20 vol %, in a histogram showing distribution of orientation differences between adjacent pairs each consisting of two of the tungsten carbide grains adjacent to each other in the cemented carbide, a first peak is present in a class of the orientation differences of no less than 29.5° and less than 30.5°.

7 Claims, 2 Drawing Sheets

(56) References Cited

OTHER PUBLICATIONS

Written Opinion dated Feb. 22, 2022, received for PCT Application PCT/JP2022/002016, filed on Jan. 20, 2022, 7 pages including English Translation.
Vineet Kumar, et al., "An Analysis of Grain Boundaries and Grain Growth in Cemented Tungsten Carbide Using Orientation Imaging Microscopy", Metallurgical and Materials Transactions A, vol. 37A, Mar. 2006, 9 pages.
Xingwei Liu, et al., "Low-energy grain boundaries in WC-Co cemented carbides", Acta Materialia 175, Available online Jun. 11, 2019, 11 pages.
Hisashi Suzuki, "Cemented Carbides and Sintered Hard Materials", Feb. 20, 1986, 25 pages.
Chang-Soo Kim, et al., "Geometric and Crystallographic Characterization of WC Surfaces and Grain Boundaries in WC-Co Composites", Interface Science 12, 2004, 9 pages.
Xiaokun Yuan, et al., "Effect of plastic deformation on the 22 grain boundary plane distribution in WC-Co cemented carbides", Int. Journal of Refractory Metals and Hard Materials 47, Available online Jun. 2, 2014, 6 pages.
Xiaokun Yuan, et al., "Characterization of grain boundary character distribution in cemented carbides via a stereological method", Processing and Application of Ceramics 16[4], Accepted Oct. 14, 2022, 10 pages.
Motonori Mitoh, "Fundamental Principles of Adhesive Bonding", Journal of Japan Welding Society, vol. 81, No. 6, 2012, 19 pages.

\* cited by examiner

CEMENTED CARBIDE AND TOOL CONTAINING THE SAME

CROSS-REFERENCE TO RELATED APPLICATION

The present application is based on PCT filing PCT/JP2022/002016, filed Jan. 20, 2022, the entire contents of which are incorporated herein by reference.

TECHNICAL FIELD

The present disclosure relates to a cemented carbide and a tool containing the same.

BACKGROUND ART

A cemented carbide including tungsten carbide grains and a binder phase containing cobalt is in extensive use as a material for cutting tools (Patent Literature 1).

CITATION LIST

Patent Literature

PTL 1: Japanese Patent Laying-Open No. 2008-132570

SUMMARY OF INVENTION

A cemented carbide of the present disclosure is a cemented carbide including tungsten carbide grains and a binder phase,
  in which a total content of the tungsten carbide grains and the binder phase in the cemented carbide is no less than 80 vol %,
  a content of the binder phase in the cemented carbide is no less than 0.1 vol % and no more than 20 vol %,
  in a histogram showing distribution of orientation differences between adjacent pairs each consisting of two of the tungsten carbide grains adjacent to each other in the cemented carbide, a first peak is present in a class of the orientation differences of no less than 29.5° and less than 30.5°,
  the classes along a horizontal axis of the histogram indicate the orientation differences, and a width of the class is 1.0°, and
  a frequency along a vertical axis of the histogram indicates a ratio of the number of the adjacent pairs belonging to each class to the number of all of the adjacent pairs in the cemented carbide.
A tool of the present disclosure is a tool containing the cemented carbide.

DETAILED DESCRIPTION

Figure 1:
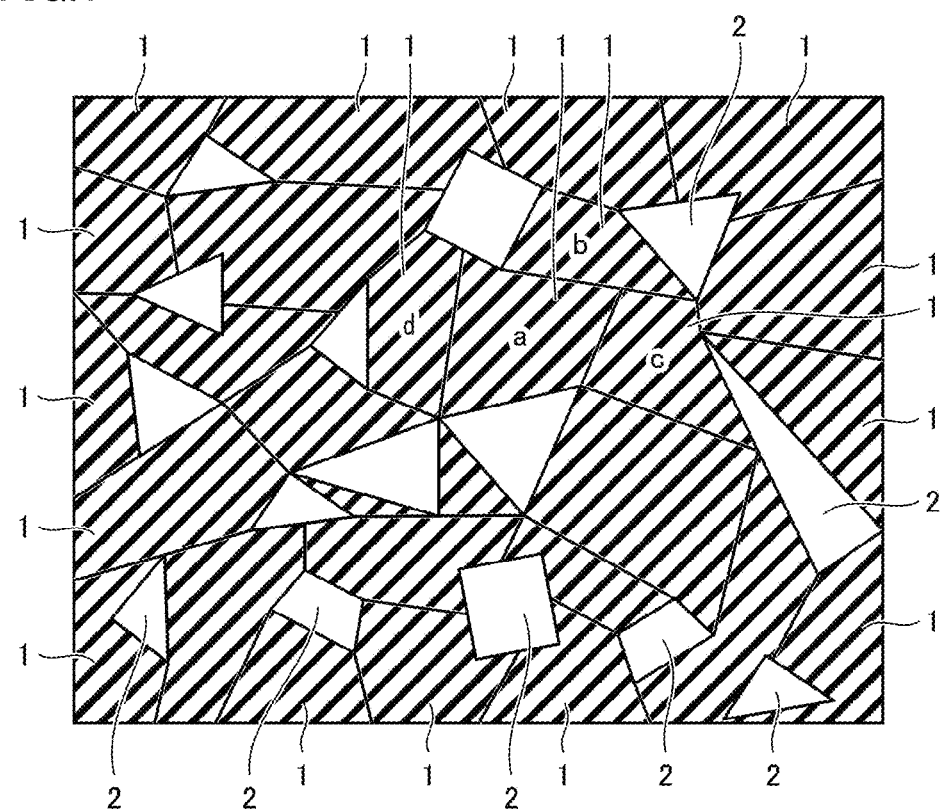
FIG. 1 is an enlarged schematic view of a cemented carbide according to Embodiment 1.

Problem to be Solved by the Present Disclosure

Recently, a demand for cost reduction has grown more intense, and tools having a long service life have been requested even in, for example, high-efficiency processing. Thus, an objective of the present disclosure is to provide a cemented carbide enabling the extension of service lives of tools in the case of being used as tool materials and a tool for which the same is used.

Advantageous Effect of the Present Disclosure

A Tool containing the cemented carbide of the present disclosure is capable of having a long tool service life.

DESCRIPTION OF EMBODIMENTS

First, embodiments of the present disclosure will be listed and described.
  (1) A cemented carbide of the present disclosure is a cemented carbide including tungsten carbide grains and a binder phase,
  in which a total content of the tungsten carbide grains and the binder phase in the cemented carbide is no less than 80 vol %,
  a content of the binder phase in the cemented carbide is no less than 0.1 vol % and no more than 20 vol %,
  in a histogram showing distribution of orientation differences between adjacent pairs each consisting of two of the tungsten carbide grains adjacent to each other in the cemented carbide, a first peak is present in a class of the orientation differences of no less than 29.5° and less than 30.5°,
  the classes along a horizontal axis of the histogram indicate the orientation differences, and a width of the class is 1.0°, and
  a frequency along a vertical axis of the histogram indicates a ratio of the number of the adjacent pairs belonging to each class to the number of all of the adjacent pairs in the cemented carbide.
A Tool containing the cemented carbide of the present disclosure is capable of having a long tool service life.
  (2) A frequency of the class of the orientation differences of no less than 29.5° and less than 30.5° is preferably no less than 0.010 and no more than 0.2. A Tool containing the cemented carbide is capable of suppressing the propagation of cracks associated with the use of the tools. Therefore, the tool service life further improves.
  (3) In the histogram, a second peak is preferably present in a class of orientation differences of no less than 89.5° and less than 90.5°. In such a case, consistency between grains is favorable, the strengths of grain interfaces are high, and the strength of the cemented carbide improves.
  (4) The histogram is preferably produced by performing EBSD analysis on a cross section of the cemented carbide and measuring orientation differences between the adjacent pairs for all tungsten carbide grains present in an 85 μm×115 μm rectangular measurement visual field provided on the cross section.
  (5) A tool of the present disclosure is a tool containing the cemented carbide. The tool of the present disclosure is capable of having a long tool service life.

Details of Embodiments of Present Disclosure

Hereinafter, specific examples of the cemented carbide of the present disclosure and a tool for which the same is used will be described with reference to the drawings. In the drawings of the present disclosure, the same reference sign indicates the same portions or equivalent portions. In addition, dimensional relationships of lengths, widths, thicknesses, depths and the like have been modified as appropriate in order for the clarification and simplification of the drawings and do not necessarily indicate actual dimensional relationships.

A numerical expression in the form of "A to B" herein means the upper limit and lower limit of a range (that is, no less than A and no more than B), and, when a unit is not put after A but put after B only, the unit of A and the unit of B are the same.

When a compound or the like is herein represented by a chemical formula and when the atomic proportions are not particularly limited, the atomic proportions include all conventionally-known atomic proportions and are not necessarily limited only to atomic proportions within the stoichiometric ranges.

Embodiment 1: Cemented Carbide

A cemented carbide of an embodiment of the present disclosure (hereinafter, also referred to as "the present embodiment" or "Embodiment 1") is
  a cemented carbide including tungsten carbide grains and a binder phase,
  in which a total content of the tungsten carbide grains and the binder phase in the cemented carbide is no less than 80 vol %,
  a content of the binder phase in the cemented carbide is no less than 0.1 vol % and no more than 20 vol %,
  in a histogram showing distribution of orientation differences between adjacent pairs each consisting of two of the tungsten carbide grains adjacent to each other in the cemented carbide, a first peak is present in a class of the orientation differences of no less than 29.5° and less than 30.5°,
  the classes along a horizontal axis of the histogram indicate the orientation differences, and a width of the class is 1.0°, and
  a frequency along a vertical axis of the histogram indicates a ratio of the number of the adjacent pairs belonging to each class to the number of all of the adjacent pairs in the cemented carbide.

A Tool containing the cemented carbide of the present embodiment is capable of having a long tool service life. The reasons therefor are assumed as described in the following (i) and (ii).
  (i) In the cemented carbide of the present embodiment, the total content of the tungsten carbide grains (hereinafter, also referred to as "WC grains") and the binder phase is no less than 80 vol %, and the content of the binder phase in the cemented carbide is no less than 0.1 vol % and no more than 20 vol %. In such a case, the cemented carbide is capable of having hardness and wear resistance appropriate for tools.
  (ii) In a histogram showing the distribution of orientation differences between adjacent pairs each consisting of two of the tungsten carbide grains adjacent to each other in the cemented carbide of the present embodiment, a first peak is present in a class of the orientation differences of no less than 29.5° and less than 30.5°. Therefore, the tungsten carbide grains in the cemented carbide structure are anisotropic, and it is possible to suppress the propagation of cracks associated with the use of tools containing the cemented carbide.

<Composition of Cemented Carbide>

The cemented carbide of Embodiment 1 includes tungsten carbide grains and a binder phase. In the cemented carbide of Embodiment 1, the lower limit of the total content of the tungsten carbide grains and the binder phase is preferably no less than 80 vol %, no less than 82 vol % or no less than 84 vol %. In the cemented carbide of Embodiment 1, the upper limit of the total content of the tungsten carbide grains and the binder phase is preferably no more than 100 vol %. In the cemented carbide of Embodiment 1, the total content of the tungsten carbide grains and the binder phase is preferably no less than 80 vol % and no more than 100 vol %, no less than 82 vol % and no more than 100 vol % or no less than 84 vol % and no more than 100 vol %.

In Embodiment 1, the lower limit of the content of the tungsten carbide grains in the cemented carbide can be set to no less than 60 vol %, no less than 62 vol %, no less than 64 vol % or no less than 70 vol %. The upper limit of the content of the tungsten carbide grains in the cemented carbide can be set to no more than 99.9 vol %, no more than 99 vol %, no more than 98 vol % or no more than 95 vol %. The content of the tungsten carbide grains in the cemented carbide can be set to no less than 60 vol % and no more than 99.9 vol %, no less than 62 vol % and no more than 99.9 vol %, no less than 64 vol % and no more than 99.9 vol %, no less than 70 vol % and no more than 99.9 vol %, no less than 60 vol % and no more than 99 vol %, no less than 62 vol % and no more than 99 vol %, no less than 64 vol % and no more than 99 vol %, no less than 70 vol % and no more than 99 vol %, no less than 60 vol % and no more than 98 vol %, no less than 62 vol % and no more than 98 vol %, no less than 64 vol % and no more than 98 vol %, no less than 70 vol % and no more than 98 vol %, no less than 60 vol % and no more than 95 vol %, no less than 62 vol % and no more than 95 vol %, no less than 64 vol % and no more than 95 vol % or no less than 70 vol % and no more than 95 vol %.

In Embodiment 1, the content of the binder phase in the cemented carbide is no less than 0.1 vol % and no more than 20 vol %. In such a case, the toughness of the cemented carbide improves. The lower limit of the content of the binder phase in the cemented carbide can be set to no less than 0.1 vol %, no less than 0.5 vol %, no less than 1 vol % or no less than 2 vol %. The upper limit of the content of the binder phase in the cemented carbide can be set to no more than 20 vol %, no more than 18 vol %, no more than 16 vol % or no more than 14 vol %. The content of the binder phase in the cemented carbide can be set to no less than 0.1 vol % and no more than 20 vol %, no less than 0.5 vol % and no more than 20 vol %, no less than 1 vol % and no more than 20 vol %, no less than 2 vol % and no more than 20 vol %, no less than 0.1 vol % and no more than 18 vol %, no less than 0.5 vol % and no more than 18 vol %, no less than 1 vol % and no more than 18 vol %, no less than 2 vol % and no more than 18 vol %, no less than 0.1 vol % and no more than 16 vol %, no less than 0.5 vol % and no more than 16 vol %, no less than 1 vol % and no more than 16 vol %, no less than 2 vol % and no more than 16 vol %, no less than 0.1 vol % and no more than 14 vol %, no less than 0.5 vol % and no more than 14 vol %, no less than 1 vol % and no more than 14 vol % or no less than 2 vol % and no more than 14 vol %.

The cemented carbide of Embodiment 1 is preferably composed of tungsten carbide grains and a binder phase. The cemented carbide may contain, in addition to tungsten carbide grains and a binder phase, hard phase grains other than tungsten carbide and/or an impurity as long as the effect of the present disclosure is not impaired. Examples of the hard phase grains include carbides, nitrides, carbonitrides and oxide containing at least one selected from the group consisting of titanium, niobium, tantalum, zirconium, molybdenum, chromium and vanadium, and solid solutions or complexes thereof. Examples of the impurity include iron, molybdenum, calcium, silicon, sulfur and the like. The cemented carbide can be composed of tungsten carbide grains, a binder phase and an impurity. The cemented carbide can be composed of tungsten carbide grains, a binder phase and hard phase grains. The cemented carbide can be composed of tungsten carbide grains, a binder phase, hard phase grains and an impurity.

In Embodiment 1, the cemented carbide may include hard phase grains. The lower limit of the content of the hard phase grains in the cemented carbide can be set to no less than 0 vol %, no less than 0.1 vol % or no less than 0.2 vol %. The upper limit of the content of the hard phase grains in the cemented carbide can be set to no more than 20 vol %, no more than 18 vol % or no more than 16 vol %. The content of the hard phase grains in the cemented carbide can be set to no less than 0 vol % and no more than 20 vol %, no less than 0.1 vol % and no more than 20 vol %, no less than 0.2 vol % and no more than 20 vol %, no less than 0 vol % and no more than 18 vol %, no less than 0.1 vol % and no more than 18 vol %, no less than 0.2 vol % and no more than 18 vol %, no less than 0 vol % and no more than 16 vol %, no less than 0.1 vol % and no more than 16 vol % or no less than 0.2 vol % and no more than 16 vol %.

A method for measuring the content of the tungsten carbide grains, the content of the binder phase and the content of the hard phase grains in the cemented carbide is as described in the following (A1) to (H1).

(A1) The cemented carbide is cut at any position to expose a cross section. The cross section is mirror-like finished with a CROSS SECTION POLISHER (manufactured by JEOL Ltd.).

(B1) The mirror-like finished surface of the cemented carbide is analyzed using scanning electron microscopy with energy dispersive X-ray spectroscopy (SEM-EDX) (device: Gemini 450 (trademark) manufactured by Carl Zeiss AG), and elements that are contained in the cemented carbide are specified.

(C1) The mirror-like finished surface of the cemented carbide is captured with a scanning electron microscope (SEM) to obtain a backscattered electron image. The captured region of the captured image is set to the central portion of the cross section of the cemented carbide, that is, a position where a portion having properties clearly different from those of the bulk portion, such as a vicinity of the surface of the cemented carbide, is not included (a position where all of the captured region becomes the bulk portion of the cemented carbide). The observation magnification is 5000 times. The measurement conditions are an accelerating voltage of 3 kV, a current value of 2 nA and a working distance (WD) of 5 mm.

(D1) The captured region of the (C1) is analyzed using an energy dispersive X-ray spectrometer with a scanning electron microscope (SEM-EDX), the distribution of the elements specified in the (B1) in the captured region is specified, and an element mapping image is obtained.

(E1) The backscattered electron image obtained in the (C1) is loaded onto a computer, and a binarization treatment is performed using image analysis software (OpenCV, SciPy). The binarization treatment is performed such that, among the tungsten carbide grains, the binder phase and the hard phase grains in the backscattered electron image, only the hard phase grains are extracted. The binarization threshold varies with contrast and is thus set for each image.

(F1) The element mapping image obtained in the (D1) and the binarized image obtained in the (E1) are overlapped, thereby specifying the presence region of each of the tungsten carbide grains, the binder phase and the hard phase grains on the binarized image. Specifically, a region which is shown white on the binarized image and in which tungsten (W) and carbon (C) are present on the element mapping image corresponds to the presence region of the tungsten carbide grains. A region which is shown black on the binarized image and in which at least one selected from the group consisting of titanium, niobium, tantalum, zirconium, molybdenum, chromium and vanadium is present on the element mapping image corresponds to the presence region of the hard phase grains. A region which is shown white on the binarized image and in which at least one element selected from the group consisting of iron, cobalt and nickel is present on the element mapping image corresponds to the presence region of the binder phase.

(G1) One 24.9 μm×18.8 μm rectangular measurement visual field is set in the binarized image. The area percentage of each of the tungsten carbide grains, the binder phase and the hard phase grains is measured with respect to the area of the entire measurement region as a denominator using the image analysis software.

(H1) The measurement of the (G1) is performed in five measurement visual fields that do not overlap one another. In the present specification, the average of the area percentages of the tungsten carbide grains in the five measurement visual fields corresponds to the content (vol %) of the tungsten carbide grains in the cemented carbide, the average of the area percentages of the binder phase in the five measurement visual fields corresponds to the content (vol %) of the binder phase in the cemented carbide, and the average of the area percentages of the hard phase grains in the five measurement visual fields corresponds to the content (vol %) of the hard phase grains in the cemented carbide.

It was confirmed from the measurement on the same specimen by the applicant that, even when any cutting spot on the cross section of the cemented carbide was set, any captured region that is described in the (C1) was set on the cross section, any five measurement visual fields that are described in the (H1) were set, and the content of the tungsten carbide grains, the content of the binder phase and the content of the hard phase grains in the cemented carbide were measured a plurality of times according to the above-described procedure, variations in the measurement results were small, and, even when any cutting spot on the cross section of the cemented carbide was set, any captured region on the backscattered electron image was set, and any measurement visual fields were set, the measurement results were not arbitrary.

The content of the impurity in the cemented carbide (in a case where two or more kinds of impurities are contained, the total content thereof) is preferably no less than 0 mass % and less than 0.1 mass %. The content of the impurity in the cemented carbide is measured by inductively coupled plasma emission spectroscopy (measuring instrument: "ICPS-8100" (trademark) by Shimadzu Corporation).

<Tungsten Carbide Grains>
<<Composition>>

The tungsten carbide grains (hereinafter, also referred to as "WC grains") are grains made of tungsten carbide. The WC grains may contain iron (Fe), molybdenum (Mo), calcium (Ca), silicon (Si), sulfur (S) and the like as long as the effect of the present disclosure is not impaired. The content of iron (Fe), molybdenum (Mo), calcium (Ca), silicon (Si) and sulfur (S) in the WC grains (in a case where two or more thereof are contained, the total content thereof) is preferably no less than 0 mass % and less than 0.1 mass %. The content of iron (Fe), molybdenum (Mo), calcium (Ca), silicon (Si) and sulfur (S) in the WC grains is measured by ICP emission spectroscopy.

<<Average Grain Diameter>>

The lower limit of the average grain diameter of the tungsten carbide grains in Embodiment 1 is preferably no less than 0.1 µm, no less than 0.2 µm or no less than 0.3 µm. The upper limit of the average grain diameter of the tungsten carbide grains is preferably no more than 3.5 µm, no more than 3.0 µm or no more than 2.5 µm. The average grain diameter of the tungsten carbide grains is preferably no less than 0.1 µm and no more than 3.5 µm, no less than 0.2 µm and no more than 3.5 µm, no less than 0.3 µm and no more than 3.5 µm, no less than 0.1 µm and no more than 3.0 µm, no less than 0.2 µm and no more than 3.0 µm, no less than 0.3 µm and no more than 3.0 µm, no less than 0.1 µm and no more than 2.5 µm, no less than 0.2 µm and no more than 2.5 µm or no less than 0.3 µm and no more than 2.5 µm. In such a case, the cemented carbide has high hardness, and the wear resistance of a tool containing the cemented carbide improves. In addition, the tool can have excellent breakage resistance.

In the present specification, the average grain diameter of the tungsten carbide grains means D50 (an equivalent circle diameter at which the cumulative number-based frequency reaches 50%, median diameter D50) of equal area equivalent circle diameters (Heywood diameters) of the WC grains that are included in the cemented carbide. A method for measuring the average grain diameter of the tungsten carbide grains is as described below.

(A2) The presence region of the tungsten carbide grains is specified on the binarized image by the same method as the (A1) to (F1) of the method for measuring the content of the tungsten carbide grains, the content of the binder phase and the content of the hard phase grains in the cemented carbide.

(B2) One 24.9 µm×18.8 µm rectangular measurement visual field is set in the binarized image. The outer edge of each tungsten carbide grain in the measurement visual field is specified using the image analysis software, and the equivalent circle diameter (Heywood diameter: equal area equivalent circle diameter) of each tungsten carbide grain is calculated.

(C2) D50 of the equal area equivalent circle diameters of the tungsten carbide grains is calculated based on all of the tungsten carbide grains in the measurement visual field.

It was confirmed from the measurement on the same specimen by the applicant that, even when any cutting spot on the cross section of the cemented carbide was set, any captured region that is described in the (C1) was set on the cross section, any measurement visual field that is described in the (B2) was set, and the average grain diameter of the tungsten carbide grains was measured a plurality of times according to the above-described procedure, a variation in the measurement results was small, and, even when any cutting spot on the cross section of the cemented carbide was set, any captured region on the captured image was set, and any measurement visual fields were set, the measurement results were not arbitrary.

<Binder Phase>

The cemented carbide of the present embodiment includes a binder phase. The binder phase preferably contains at least one first element selected from the group consisting of iron, cobalt and nickel. The content of the first element in the binder phase (in a case where the first element is each consisting of two or more kinds of elements, the total content thereof) is preferably no less than 90 mass % and no more than 100 mass %, no less than 95 mass % and no more than 100 mass %, no less than 98 mass % and no more than 100 mass % or 100 mass %.

In the present embodiment, the binder phase preferably contains cobalt as a main component. Here, the expression "the binder phase contains cobalt as the main component" means that the content of cobalt in the binder phase is no less than 90 mass % and no more than 100 mass %.

In the present embodiment, the binder phase may contain, in addition to the first element, tungsten (W), chromium (Cr), vanadium (V), titanium (Ti), niobium (Nb), tantalum (Ta) or the like.

The composition of the binder phase can be measured by inductively coupled plasma emission spectroscopy (device used: "ICPS-8100" (trademark) manufactured by Shimadzu Corporation).

<Distribution of Orientation Differences between Adjacent Pairs>

In a histogram showing the distribution of orientation differences between adjacent pairs each consisting of two of the tungsten carbide grains adjacent to each other in the cemented carbide of Embodiment 1, a first peak is present in a class of the orientation differences of no less than 29.5° and less than 30.5°. Here, the classes along the horizontal axis of the histogram indicate orientation differences, the width of the class is 1.0°, and the frequency along the vertical axis of the histogram indicates the ratio of the number of adjacent pairs belonging to each class to the number of all adjacent pairs in the cemented carbide. In such a case, the tungsten carbide grains in the cemented carbide structure are anisotropic, and it is possible to suppress the propagation of cracks associated with the use of tools containing the cemented carbide.

The adjacent pairs in Embodiment 1 will be described using FIG. 1. FIG. 1 shows an enlarged schematic view of the cemented carbide of Embodiment 1. First, any one WC grain among a plurality of tungsten carbide grains 1 in FIG. 1 is selected. In FIG. 1, any one tungsten carbide grain 1 selected is indicated by a reference sign a. For the tungsten carbide grain indicated by the reference sign a (hereinafter, also referred to as "WC grain a"), three adjacent tungsten carbide grains indicated by reference signs b, c and d (hereinafter, referred to as "WC grain b", "WC grain c" and "WC grain d") are present. That is, based on WC grain a, three adjacent pairs of an adjacent pair of WC grain a and WC grain b, an adjacent pair of WC grain a and WC grain c and an adjacent pair of WC grain a and WC grain d are present. Regarding WC grain a, an orientation difference between the adjacent pairs is measured for each of the three adjacent pairs.

Figure 2:
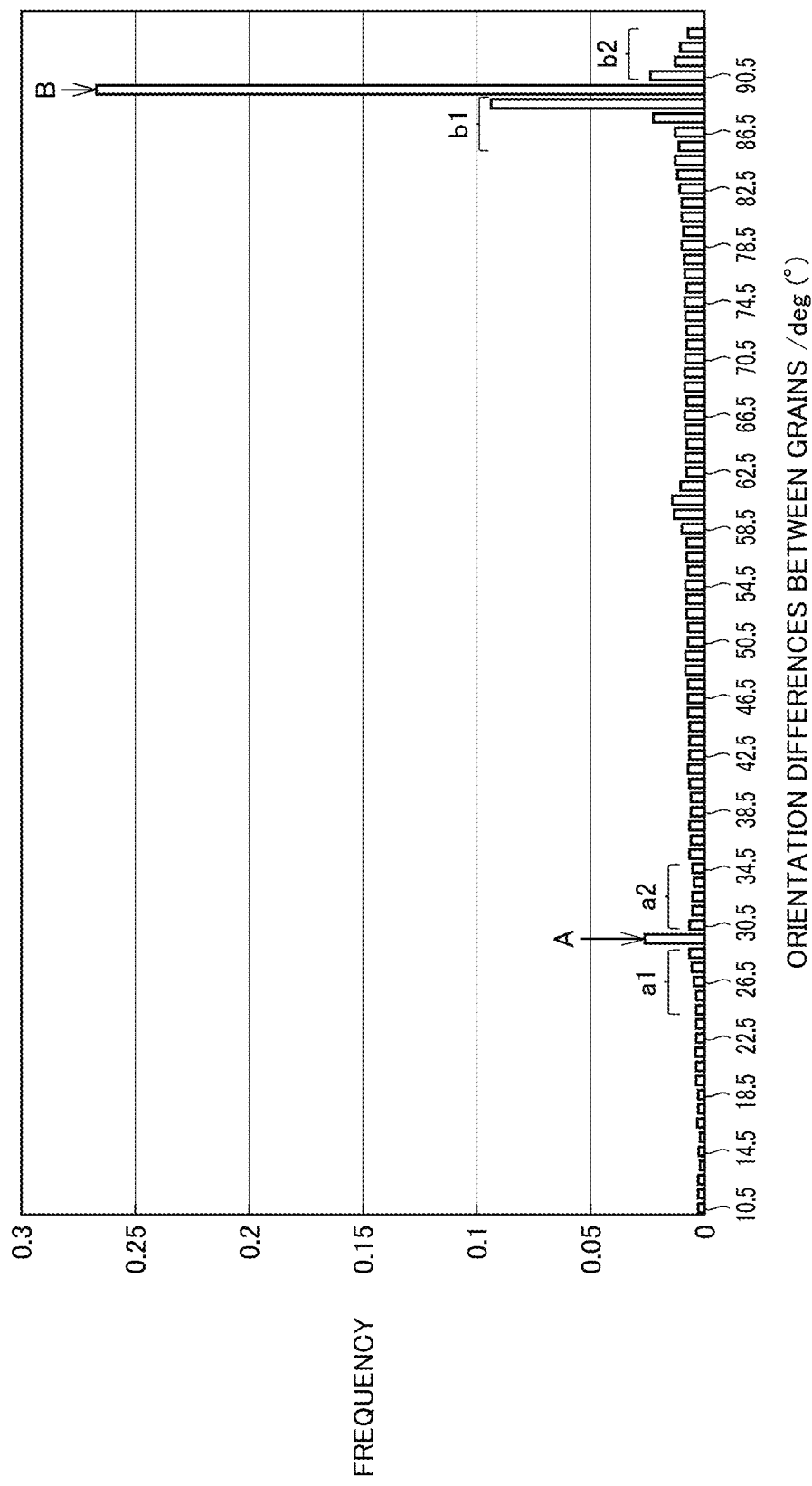
FIG. 2 is an example of a histogram showing distribution of orientation differences between adjacent pairs each consisting of two tungsten carbide grains adjacent to each other in the cemented carbide according to Embodiment 1.

The histogram of the cemented carbide of Embodiment 1 will be described using FIG. 2. FIG. 2 shows an example of the histogram of the cemented carbide of Embodiment 1.

In the histogram of FIG. 2, the classes along the horizontal axis indicate orientation differences between adjacent pairs each consisting of two of the tungsten carbide grains adjacent to each other in the cemented carbide, and the width of the class is 1.0°. Along the horizontal axis, the classes of the orientation differences are arranged in ascending order. The frequency along the vertical axis of the histogram indicates the ratio of the number of the adjacent pairs belonging to each class to the number of all of the adjacent pairs in the cemented carbide. Numerical values along the horizontal axis of FIG. 2 indicate the lower limits of the classes. For example, the class of a rod indicated by 26.5 includes orientation differences of no less than 26.5° and less than 27.5°.

In the histogram of FIG. 2, a first peak indicated by a reference sign A is present in a class of orientation differences of no less than 29.5° and less than 30.5°. In the present specification, the expression "the first peak is present in a class of orientation differences of no less than 29.5° and less than 30.5° in the histogram" means that the frequency of the class of the orientation differences of no less than 29.5° and less than 30.5° satisfies the following condition (a).

(a) The frequency of the class of the orientation differences of no less than 29.5° and less than 30.5° is no less than 1.2 times the maximum value of the frequencies of 10 classes in a range of the orientation differences of no less than 24.5° and less than 29.5° and orientation differences of no less than 30.5° and less than 35.5°.

In FIG. 2, the frequency of the class of the orientation differences of no less than 29.5° and less than 30.5° is 0.026. In FIG. 2, the 10 classes in the range of the orientation differences of no less than 24.5° and less than 29.5° and the orientation differences of no less than 30.5° and less than 35.5° are five classes within a range indicated by a reference sign a1 and five classes within a range indicated by a reference sign a2. The maximum value of the frequencies of these 10 classes is 0.007, which is the frequency of a class of orientation differences of no less than 28.5° and less than 29.5°. The frequency of the class of the orientation differences of no less than 29.5° and less than 30.5°, which is 0.026, is 3.7 times the maximum value of the frequencies of the 10 classes, which is 0.007. Therefore, the histogram shown in FIG. 2 satisfies the condition (a).

In the histogram of the cemented carbide of Embodiment 1, the lower limit of the frequency of the class of the orientation differences of no less than 29.5° and less than 30.5° is preferably no less than 0.010, no less than 0.011 or no less than 0.012 from the viewpoint of improvement in an effect on crack propagation suppression. The upper limit of the frequency of the class of the orientation differences of no less than 29.5° and less than 30.5° is not particularly limited and can be set to, for example, no more than 0.2. The frequency of the class of the orientation differences of no less than 29.5° and less than 30.5° is preferably no less than 0.010 and no more than 0.2, no less than 0.011 and no more than 0.2 or no less than 0.012 and no more than 0.2.

In the histogram of the cemented carbide of Embodiment 1, the frequency of the class of the orientation differences of no less than 29.5° and less than 30.5° is no less than 1.2 times the maximum value of the frequencies of the 10 classes and is preferably no less than twice or no less than triple.

In the histogram of the cemented carbide of Embodiment 1, a second peak is preferably present in a class of orientation differences of no less than 89.5° and less than 90.5°. In such a case, consistency between grains is favorable, the strengths of grain interfaces are high, and the strength of the cemented carbide improves.

In the histogram of FIG. 2, the second peak indicated by a reference sign B is present in a class of orientation differences of no less than 89.5° and less than 90.5°. In the present specification, the expression "the second peak is present in a class of orientation differences of no less than 89.5° and less than 90.5° in the histogram" means that the frequency of the class of the orientation differences of no less than 89.5° and less than 90.5° satisfies the following condition (b).

(b) The frequency of the class of the orientation differences of no less than 89.5° and less than 90.5° is no less than 1.5 times the maximum value of the frequencies of eight classes in a range of orientation differences of no less than 85.5° and less than 89.5° and in a range of orientation differences of no less than 90.5° and less than 94.5°.

In FIG. 2, the frequency of the class of the orientation differences of no less than 89.5° and less than 90.5° is 0.267. In FIG. 2, the eight classes in the range of the orientation differences of no less than 85.5° and less than 89.5° and in the range of the orientation differences of no less than 90.5° and less than 94.5° are four classes within a range indicated by a reference sign b1 and four classes within a range indicated by a reference sign b2. The maximum value of the frequencies of these eight classes is 0.094, which is the frequency of a class of orientation differences of no less than 88.5° and less than 89.5°. The frequency of the class of the orientation differences of no less than 89.5° and less than 90.5°, which is 0.267, is 2.8 times the maximum value of the frequencies of the eight classes, which is 0.094. Therefore, the histogram shown in FIG. 2 satisfies the condition (b).

In the histogram of the cemented carbide of Embodiment 1, the lower limit of the frequency of the class of the orientation differences of no less than 89.5° and less than 90.5° is preferably no less than 0.10, no less than 0.12 or no less than 0.14 from the viewpoint of improvement in an effect on crack propagation suppression. The upper limit of the frequency of the class of the orientation differences of no less than 89.5° and less than 90.5° is not particularly limited and can be set to, for example, no more than 0.3. The frequency of the class of the orientation differences of no less than 89.5° and less than 90.5° is preferably no less than 0.10 and no more than 0.3, no less than 0.12 and no more than 0.3 or no less than 0.14 and no more than 0.3.

In the histogram of the cemented carbide of Embodiment 1, the frequency of the class of the orientation differences of no less than 89.5° and less than 90.5° is no less than 1.5 times the maximum value of the frequencies of the eight classes and is preferably no less than 1.7 times or no less than 2.0 times.

In the present specification, the histogram is produced in the following procedure.

(A3) The cemented carbide is cut at any position to expose a cross section. The cross section is mirror-like finished with a CROSS SECTION POLISHER (manufactured by JEOL Ltd.).

(B3) The mirror-like finished surface is observed using a scanning electron microscope (SEM, device: Gemini 450 (trademark) manufactured by Carl Zeiss AG) including an electron backscatter diffraction device (EBSD device: Symmetry (trademark) manufactured by Oxford Instruments), and EBSD analysis is performed on the obtained observation image. The observation region is set to the central portion of the treated surface of the cemented carbide, that is, a position where a portion having properties clearly different from those of the bulk portion, such as a vicinity of the surface of the cemented carbide, is not included (a position where all of the observation region becomes the bulk portion of the cemented carbide).

The measurement region is an 85 μm×115 μm rectangular region on the mirror-like finished surface. As the measurement conditions, the accelerating voltage is set to 15 kV, the current value is set to 20 nA, the step size is set to 40 nm, the exposure time is set to 0.1 to 1 ms, and the measurement time is set to one to two hours.

(C3) The EBSD analysis result is analyzed using commercially available software (AZtecCrystal (trademark)

manufactured by Oxford Instruments), and the crystal orientation of each tungsten carbide grain included in the measurement region is specified. Here, the crystal orientation of each tungsten carbide grain to be specified is a crystal orientation that is observed when each tungsten carbide grain appearing on the mirror-like finished surface of the cemented carbide is viewed in a plan view in the normal direction to the mirror-like finished surface.

Based on the obtained crystal orientation of each tungsten carbide grain, orientation differences between adjacent pairs are measured for all of the WC grains in the measurement region. Even in a case where a part of the WC grain is present outside the measurement region, an orientation difference is measured for the WC grain.

In the present specification, the expression "two WC grains are adjacent to each other" means that at least a part of one WC grain and at least a part of another WC grain are in contact with each other. In a case where two close measurement points in EBSD are both identified as WC and the difference in crystal orientation is no less than 10° in the boundary between the two measurement points (corresponding to the boundary between the WC grains), the two measurement points are determined to be different WC grains.

(D3) The orientation differences are measured in three different measurement regions. Based on the sum of the measurement results of the three measurement regions, a histogram showing the distribution of orientation differences between adjacent pairs each consisting of two tungsten carbide grains adjacent to each other in the three measurement regions is produced using the above-described software. The histogram corresponds to the histogram of the cemented carbide of Embodiment 1.

It was confirmed from the measurement on the same specimen by the applicant that, even when any cutting spot on the cross section of the cemented carbide was set, any captured region and the measurement region that are described in the (B3) were set on the cross section, and the histogram was produced according to the above-described procedure, a variation in the histogram was small, and, even when any cutting spot on the cross section of the cemented carbide was set, any captured region on the captured image was set, and any measurement region was set, the histogram were not arbitrary.

<Method for Producing Cemented Carbide>

The cemented carbide of Embodiment 1 can be produced by, for example, the following method. A raw material powder is prepared. As a raw material of the tungsten carbide grains, a tungsten carbide (WC) powder is prepared. Examples of a raw material of the binder phase include a cobalt (Co) powder, an iron (Fe) powder and a nickel (Ni) powder. Examples of a raw material of the hard phase grains include a TiC powder, a TiN powder, a TiCN powder, a NbC powder, a TaC powder, a ZrC powder, a $Mo_2C$ powder, a $TiO_2$ powder, a $Nb_2O_5$ powder and solid solutions or complexes thereof. As a grain growth inhibitor, a chromium carbide ($Cr_3C_2$) powder or a vanadium carbide (VC) powder can be used.

The average particle diameter of the tungsten carbide (WC) powder can be set to no less than 0.1 μm and no more than 3.5 μm. The average particle diameter of the cobalt (Co) powder can be set to no less than 0.5 μm and no more than 3.5 μm. The average particle diameter of the iron (Fe) powder can be set to no less than 0.5 μm and no more than 3.5 μm. The average particle diameter of the nickel (Ni) powder can be set to no less than 0.5 μm and no more than 3.5 μm. The average particle diameter of the chromium carbide ($Cr_3C_2$) powder can be set to no less than 0.5 μm and no more than 3.5 μm. The average particle diameter of the vanadium carbide (VC) powder can be set to no less than 0.5 μm and no more than 3.5 μm. The average particle diameter of the raw material powder means the number-based median diameter d50 of the sphere equivalent diameters of the raw material powders. The average particle diameter of the raw material powder is measured using a grainsize distribution measuring instrument (trade name: MT3300EX) manufactured by MicrotracBEL Corp.

Next, the raw material powders are mixed together to obtain a powder mixture. An attritor or a ball mill can be used for the mixing. The mixing time in the attritor can be set to no shorter than four hours and no longer than 18 hours. The mixing time in the ball mill can be set to no shorter than four hours and no longer than 72 hours.

Next, the powder mixture is molded into a desired shape and pressed at a high pressure to afford a compact. The pressure during the high-pressure pressing is set to no lower than 100 MPa. Next, the compact is degreased by being heated up to 800° C. in a vacuum.

Next, cold isostatic pressing (CIP) is performed on the degreased compact. The pressure during the CIP is set to 392 MPa, and the treatment time is set to 60 to 600 minutes.

Next, the compact after the CIP is heated up to 1000° C. in a vacuum and then sintered to afford a sintered body. Regarding the sintering conditions, the compact is heated up to 1380° C. at 7 MPa in an argon atmosphere at a temperature rise rate of 10° C./minute, and the retention time at 1380° C. can be set to two hours. Instead of the argon atmosphere, the compact may be heated in a nitrogen atmosphere.

Next, the sintered body is quenched in the argon atmosphere. Subsequently, hot isostatic pressing (HIP) is performed on the sintered body after the completion of cooling to afford cemented carbide. Regarding the HIP conditions, the sintered body can be retained at 1330° C. and 200 MPa for a retention time of two hours.

Embodiment 2: Tool

A tool of the present embodiment contains the cemented carbide of Embodiment 1. As the tool, for example, a cutting tool, a drill, an end mill, a blade edge-replaceable cutting tip for milling, a blade edge-replaceable cutting tip for turning, a metal saw, a gear cutting tool, a reamer, a tap and the like can be exemplified.

The cemented carbide of the present embodiment may fully or partially configure these tools. Here, the expression "partially configure" indicates an aspect in which the cemented carbide of the present embodiment is brazed to a predetermined position on any base material to form a blade edge portion.

<<Hard Film>>

A cutting tool according to the present embodiment may further include a hard film that covers at least a part of the surface of a base material composed of cemented carbide. As the hard film, for example, diamond-like carbon or diamond can be used.

EXAMPLES

The present embodiment will be more specifically described using Examples. However, the present embodiment is not limited to these Examples.

[Production of Cemented Carbide]

<Specimen 1 to Specimen 8>

As raw material powders, a WC powder (average particle diameter: 0.8 μm), a Co powder (average particle diameter: 1 μm), a TiCN powder (average particle diameter: 1 μm), a NbC powder (average particle diameter: 1 μm), a TaC powder (average particle diameter: 1 μm), a ZrC powder (average particle diameter: 1 μm) and a $Mo_2C$ powder (average particle diameter: 1 μm) are prepared.

The raw material powders were mixed at proportions shown in the "raw material powders" column of Table 1 to obtain powder mixtures. For example, in Specimen 1, 100 vol % of a powder mixture is 99.9 vol % of the WC powder and 0.1 vol % of the Co powder. In a case where two or more kinds of powders were used as hard phase raw material powders, these powders were used in quantities obtained by equally dividing all of the hard phase raw material powders (vol %). For example, in Specimen 5, all of hard phase raw material powders are 20 vol %, and a breakdown thereof is 10 vol % of the TiCN powder and 10 vol % of the NbC powder. For the mixing, an attritor was used. The mixing time in the attritor is eight hours.

The obtained powder mixtures were pressed into a tool shape (Model No. SEET13T3AGSN-G (Sumitomo Electric Hardmetal Corp.)) and then pressed at a high pressure to afford compacts. The pressure during the high-pressure pressing was set to 100 MPa. Next, the compacts were degreased by being heated up to 800° C. in a vacuum.

Next, CIP is performed on the degreased compacts. The pressure during the CIP was set to 392 MPa, and the treatment time was set to 60 minutes.

Next, the compacts after the CIP were heated up to 1000° C. in a vacuum and then sintered to afford sintered bodies. Regarding the sintering conditions, the compacts were heated up to 1380° C. at 7 MPa in an argon atmosphere at a temperature rise rate of 10° C./minute, and the retention time at 1380° C. was set to two hours.

Next, the sintered bodies were quenched in the argon atmosphere. Subsequently, HIP was performed on the sintered bodies after the completion of cooling to afford cemented carbides. Regarding the HIP conditions, the sintered bodies were retained at 1330° C. and 200 MPa for a retention time of two hours.

<Specimen a to Specimen c>

The raw material powders were mixed at proportions shown in the "raw material powders" column of Table 1 to obtain powder mixtures. For the mixing, an attritor was used. The mixing time in the attritor is eight hours.

The obtained powder mixtures were pressed into a tool shape (Model No. SEET13T3AGSN-G (Sumitomo Electric Hardmetal Corp.)). High-pressure pressing was not performed. Next, the compacts were degreased by being heated up to 800° C. in a vacuum. CIP after the degreasing was not performed.

Next, the degreased compacts were heated up to 1000° C. in a vacuum and then sintered to afford sintered bodies. Regarding the sintering conditions, the compacts were heated up to 1380° C. at 7 MPa in an argon atmosphere at a temperature rise rate of 10° C./minute, and the retention time at 1380° C. was set to two hours.

Next, the sintered bodies were quenched in the argon atmosphere. Subsequently, HIP was performed on the sintered bodies after the completion of cooling to afford cemented carbides. Regarding the HIP conditions, the sintered bodies were retained at 1330° C. and 200 MPa for a retention time of two hours.

TABLE 1

| | Raw material powders | | | |
|---|---|---|---|---|
| Specimen No. | WC powder Vol % | Co powder Vol % | Hard phase raw material powders Composition | Vol % |
| 1 | 99.9 | 0.1 | — | — |
| 2 | 80.0 | 20.0 | — | — |
| 3 | 90.0 | 10.0 | — | — |
| 4 | 88.9 | 10.0 | TiCN, NbC | 0.1 |
| 5 | 70.0 | 10.0 | TiCN, NbC | 20.0 |
| 6 | 90.0 | 10.0 | — | — |
| 7 | 90.0 | 10.0 | — | — |
| 8 | 70.0 | 10.0 | TaC, ZrC, $Mo_2C$ | 20.0 |
| a | 65.0 | 35.0 | — | — |
| b | 100.0 | — | — | — |
| c | 90.0 | 10.0 | — | — |

[Evaluation]

<Cemented Carbides>

<<Compositions of Cemented Carbides>>

For the cemented carbide of each specimen, the contents (vol %) of the WC grains, the binder phase and the hard phase grains were measured. A specific measurement method is as described in Embodiment 1. The results are shown in the "vol %" column for "WC grains", the "vol %" column for "binder phase" and the "vol %" column for "hard phase grains" for "cemented carbide" in Table 2. The compositions of the binder phases and the hard phase grains were specified based on element mapping images. The results are shown in the "composition" column for "binder phase" and the "composition" column for "hard phase grains" in Table 2.

<<Distribution of Orientation Differences Between Adjacent Pairs>>

For the cemented carbide of each specimen, the distribution of orientation differences between adjacent pairs was measured, and a histogram was produced. A specific measurement method is as described in Embodiment 1. Based on the histogram, a frequency A of a peak in a class of orientation differences of no less than 29.5° and less than 30.5°, a maximum value a1 of the frequencies of 10 classes in a range of orientation differences of no less than 24.5° and less than 29.5° and orientation differences of no less than 30.5° and less than 35.5°, a frequency B of a peak in a class of orientation differences of no less than 89.5° and less than 90.5°, and a maximum value b1 of the frequencies of eight classes in a range of orientation differences of no less than 85.5° and less than 89.5° and in a range of orientation differences of no less than 90.5° and less than 94.5° were obtained. The results are shown in the "frequency A", "frequency a1", "frequency B" and "frequency b1" columns for "histogram" in Table 2. The expression "None" in the "frequency A" column indicates that no peak is present in the class of the orientation differences of no less than 29.5° and less than 30.5°.

Furthermore, the ratio "A/a1" of the frequency A to the frequency a1 and the ratio "B/b1" of the frequency B to the frequency b1 were calculated. The results are shown in the "A/a1" and "B/b1" columns for "histogram" in Table 2. In a case where "A/a1" is no less than 1.2, it is determined that a first peak is present ("Yes" is entered in Table 2). In a case where "B/b1" is no less than 1.5, it is determined that a second peak is present ("Yes" is entered in Table 2).

<Tool>

A tool of each specimen was mounted in a cutter (Model No. WGC4100R (Sumitomo Electric Hardmetal Corp.)), and milling of a S45C block material (with a hole of φ6 mm) was performed. Regarding the milling conditions, the cutting velocity Vc was set to 250 m/min, the table feed F was set to 0.45 mm/min, the depth of cut (axial direction) ap was set to 2.0 mm, the width of cut (radial direction) ae was set to 50 mm, and dry milling was performed. The processing lengths until a defect occurred from a crack in the tool were measured. The maximum processing length was 900 mm. It is indicated that, as the processing length increases, the defect resistance becomes superior and the tool service life becomes longer. The results are shown in the "service life" column for "tool" in Table 2. The expression "No defect" in the "service life" column indicates that no defects occurred when the processing length was 900 mm.

TABLE 2

| Specimen No. | Cemented carbide | | | | Histogram | | | | | | | Tool |
|---|---|---|---|---|---|---|---|---|---|---|---|---|
| | WC grains Vol % | Binder phase Composition | Vol % | Hard phase grains Composition | Vol % | Frequency A | Frequency a1 | A/a1 | First peak | Frequency B | Frequency b1 | B/b1 | Second peak | Service life |
| 1 | 99.9 | Co | 0.1 | — | — | 0.099 | 0.021 | 4.7 | Yes | 0.197 | 0.072 | 2.7 | Yes | 750 mm |
| 2 | 80.0 | Co | 20.0 | — | — | 0.030 | 0.005 | 6.0 | Yes | 0.142 | 0.080 | 1.8 | Yes | No defect |
| 3 | 90.0 | Co | 10.0 | — | — | 0.016 | 0.006 | 2.7 | Yes | 0.155 | 0.055 | 2.8 | Yes | 850 mm |
| 4 | 88.9 | Co | 10.0 | TiNbWCN, TiNbCN | 0.1 | 0.026 | 0.007 | 3.9 | Yes | 0.267 | 0.094 | 2.8 | Yes | No defect |
| 5 | 70.0 | Co | 10.0 | TiNbWCN, TiNbCN | 20.0 | 0.022 | 0.005 | 4.4 | Yes | 0.173 | 0.018 | 9.6 | Yes | No defect |
| 6 | 90.0 | Co | 10.0 | — | — | 0.100 | 0.007 | 14.3 | Yes | 0.220 | 0.062 | 3.5 | Yes | No defect |
| 7 | 90.0 | Co | 10.0 | — | — | 0.010 | 0.008 | 1.3 | Yes | 0.153 | 0.095 | 1.6 | Yes | 800 mm |
| 8 | 70.0 | Co | 10.0 | TaWCN, ZrC, Mo$_2$C | 20.0 | 0.042 | 0.007 | 6.0 | Yes | 0.131 | 0.044 | 3.0 | Yes | No defect |
| a | 65.0 | Co | 35.0 | — | — | None | — | — | No | 0.133 | 0.065 | 2.0 | Yes | 400 mm |
| b | 100.0 | Co | — | — | — | None | — | — | No | 0.123 | 0.059 | 2.1 | Yes | 50 mm |
| c | 90.0 | Co | 10.0 | — | — | 0.009 | 0.008 | 1.1 | No | 0.141 | 0.099 | 1.4 | No | 300 mm |

[Consideration]

The cemented carbides and the tools of Specimen 1 to Specimen 8 correspond to Examples, and the cemented carbides and the tools of Specimen a to Specimen c correspond to Comparative Examples. It was confirmed that the tools of Specimen 1 to Specimen 8 (Examples) had a long tool service life compared with the tools of Specimen a to Specimen c (Comparative Examples)

The embodiment and the examples of the present disclosure have been described as described above, and originally, appropriate combinations or various modifications of the configurations of individual embodiments and Examples described above are also planned.

The embodiment and the Examples disclosed this time shall be considered to be exemplary in all aspects and to limit nothing. The scope of the present invention is shown not by the above-described embodiments and Examples but by the claims and is intended to include equivalent meaning to the claims and all modifications within the scope.

REFERENCE SIGNS LIST

1 Tungsten carbide grain; 2 Binder phase

The invention claimed is:

1. A cemented carbide comprising tungsten carbide grains and a binder phase,
wherein a total content of the tungsten carbide grains and the binder phase in the cemented carbide is no less than 80 vol %,
a content of the binder phase in the cemented carbide is no less than 0.1 vol % and no more than 20 vol %,
in a histogram showing distribution of orientation differences between adjacent pairs each consisting of two of the tungsten carbide grains adjacent to each other in the cemented carbide, a first peak is present in a class of the orientation differences of no less than 29.5° and less than 30.5°,
the classes along a horizontal axis of the histogram indicate the orientation differences, and a width of the class is 1.0°, and
a frequency along a vertical axis of the histogram indicates a ratio of the number of the adjacent pairs belonging to each class to the number of all of the adjacent pairs in the cemented carbide.

2. The cemented carbide according to claim 1, wherein a frequency of the class of the orientation differences of no less than 29.5° and less than 30.5° is no less than 0.010 and no more than 0.2.

3. The cemented carbide according to claim 1, wherein, in the histogram, a second peak is present in a class of orientation differences of no less than 89.5° and less than 90.5°.

4. The cemented carbide according to claim 1, wherein the histogram is produced by performing EBSD analysis on a cross section of the cemented carbide and measuring orientation differences between the adjacent pairs for all tungsten carbide grains present in an 85 μm×115 μm rectangular measurement visual field provided on the cross section.

5. The cemented carbide according to claim 1, wherein a ratio of a frequency A of a peak in the class of orientation differences of no less than 29.5° and less than 30.5° to a maximum value a1 of frequencies of 10 classes in a range of orientation differences of no less than 24.5° and less than 29.5° and orientation differences of no less than 30.5° and less than 35.5°, A/a1, is no less than 1.2.

6. The cemented carbide according to claim 1, wherein the cemented carbide is prepared by a process including a step of pressing a mixture of tungsten carbide powders and binder powders to produce a compact under a pressure of no lower than 100 MPa.

7. A tool comprising the cemented carbide according to claim 1.

* * * * *